United States Patent
Yang et al.

(10) Patent No.: US 12,550,217 B2
(45) Date of Patent: Feb. 10, 2026

(54) METHOD FOR NETWORK CONFIGURATION, NON-TRANSITORY COMPUTER READABLE STORAGE MEDIUM, BASE STATION, CLEANING DEVICE AND CLEANING SYSTEM

(71) Applicant: Shenzhen Inxni Innovation Technology Co., Ltd., Shenzhen (CN)

(72) Inventors: Yang Yang, Shenzhen (CN); Juanjuan Ren, Shenzhen (CN); Guodong Zhang, Shenzhen (CN); Lirong Ye, Shenzhen (CN)

(73) Assignee: Shenzhen Inxni Innovation Technology Co., Ltd., Shenzhen (CN)

( * ) Notice: Subject to any disclaimer, the term of this patent is extended or adjusted under 35 U.S.C. 154(b) by 292 days.

(21) Appl. No.: 18/243,784

(22) Filed: Sep. 8, 2023

(65) Prior Publication Data
US 2024/0147560 A1 May 2, 2024

(30) Foreign Application Priority Data
Oct. 31, 2022 (CN) .......................... 202211347305.0

(51) Int. Cl.
| | |
|---|---|
| *H04W 76/11* | (2018.01) |
| *H04L 12/28* | (2006.01) |
| *H04W 76/18* | (2018.01) |

(52) U.S. Cl.
CPC ......... *H04W 76/18* (2018.02); *H04L 12/2807* (2013.01)

(58) Field of Classification Search
CPC . H04W 76/11; H04L 12/2803; H04L 12/2807
(Continued)

(56) References Cited

U.S. PATENT DOCUMENTS 11,589,402 B1 * 2/2023 Ebrahimi Afrouzi ........................ H04W 12/77
12,302,415 B2   5/2025 Lu et al.
(Continued)

FOREIGN PATENT DOCUMENTS

| CN | 111246545 A | 6/2020 | |
|---|---|---|---|
| CN | 112203248 A * | 1/2021 | .............. H04W 4/70 |

(Continued)

OTHER PUBLICATIONS

International Search Report for International Application No. PCT/CN2023/096956; Mailing date, Sep. 8, 2023, 5 pages.
(Continued)

*Primary Examiner* — Wesley L Kim
(74) *Attorney, Agent, or Firm* — The Sun IP Law

(57) ABSTRACT

The present invention relates to the technical field of smart home, and discloses a method for network configuration, a storage medium, a base station, a cleaning device, and a cleaning system. The method includes: generating network configuration prompt information in response to receiving a second Bluetooth MAC address sent by a second device; obtaining wireless connection information sent by a user terminal through the first Bluetooth connection; connecting to a wireless network according to the wireless connection information, and uploading the second Bluetooth MAC address to a server through the wireless network, in order that the user terminal interacts with the second device. Thus, a network configuration efficiency of connecting the first device and the second device to the wireless network can be improved.

13 Claims, 11 Drawing Sheets

(58) Field of Classification Search
USPC .......................................................... 455/500
See application file for complete search history.

(56) References Cited

U.S. PATENT DOCUMENTS

| | | | | |
|---|---|---|---|---|
| 2014/0369232 | A1* | 12/2014 | Kim | ...................... H04W 8/005 |
| | | | | 370/254 |
| 2017/0118089 | A1* | 4/2017 | Hur | ................... H04W 52/0283 |
| 2018/0288817 | A1* | 10/2018 | Windorfer | ............. H04W 76/11 |
| 2022/0417835 | A1* | 12/2022 | Huang | ................. H04W 48/16 |
| 2023/0068641 | A1 | 3/2023 | Lu et al. | |

FOREIGN PATENT DOCUMENTS

| | | |
|---|---|---|
| CN | 113766465 A | 12/2021 |
| CN | 114125895 A | 3/2022 |
| CN | 114283508 A | 4/2022 |

OTHER PUBLICATIONS

Written Opinion for International Application No. PCT/CN2023/096956; Mailing date, Sep. 8, 2023, 6 pages.

* cited by examiner

METHOD FOR NETWORK CONFIGURATION, NON-TRANSITORY COMPUTER READABLE STORAGE MEDIUM, BASE STATION, CLEANING DEVICE AND CLEANING SYSTEM

CROSS-REFERENCE TO RELATED APPLICATION

This application claims priority to Chinese patent application No. 202211347305.0, filed on Oct. 31, 2022, the entire contents of which are incorporated herein by reference.

TECHNICAL FIELD

The present application relates to the technical field of smart home, and more particularly, to a method for network configuration, a non-transitory computer readable storage medium, a base station, a cleaning device and a cleaning system.

BACKGROUND

With the development of technologies, sweeping robots gradually enter into ordinary families. A sweeping robot can automatically navigate, perform a cleaning operation automatically and move to a base station automatically to perform cleaning and maintenance operations. Each of the sweeping robot and the base station is provided with a wireless fidelity (Wi-Fi) module. Generally, a user needs to connect the sweeping robot and the base station to a wireless network manually one by one through a cleaning application (APP). This network configuration method is relatively complicated and has a low network configuration efficiency.

SUMMARY

In accordance with the first aspect of the embodiments of the present application, a method for network configuration is provided. The method is implemented by a base station, and includes:
  generating network configuration prompt information by the base station in response to receiving a second Bluetooth media access control (MAC) address sent by a cleaning device, and establishing a first Bluetooth connection between a user terminal and the base station in response to the network configuration prompt information;
  obtaining, by the base station, wireless connection information sent by the user terminal based on the first Bluetooth connection;
  connecting to a wireless network by the base station according to the wireless connection information; and
  uploading, by the base station, the second Bluetooth MAC address to a server through the wireless network, and performing, by the user terminal, an interactive operation with the cleaning device; wherein the interactive operation comprises: an operation of establishing, by the user terminal, a second Bluetooth connection operation with the cleaning device according to the second Bluetooth MAC address, and an operation of sending, by the user terminal, the wireless connection information to the cleaning device based on the second Bluetooth connection, in order that the cleaning device accesses the wireless network according to the wireless connection information.

Furthermore, before said generating the network configuration prompt information by the base station, the method further includes: sending, by the base station, a network configuration start command to the cleaning device in response to receiving a network configuration trigger command, obtaining, by the cleaning device, the second Bluetooth MAC address according to the network configuration start command.

Furthermore, said obtaining, by the cleaning device, the second Bluetooth MAC address according to the network configuration start command includes:
  activating a second Bluetooth module of the cleaning device according to the network configuration start command; and
  obtaining the second Bluetooth MAC address of the second Bluetooth module of the cleaning device.

Furthermore, after said obtaining the second Bluetooth MAC address of the second Bluetooth module of the cleaning device, the method further includes:
  detecting whether the second Bluetooth MAC address is correct; and
  sending the second Bluetooth MAC address to the base station if the second Bluetooth MAC address is correct; or alternatively,
  sending information indicating network configuration failure to the base station through the second wireless module, and terminating a network configuration operation by the base station according to the information indicating network configuration failure, if the second Bluetooth MAC address is incorrect.

In accordance with the second aspect of the embodiments of the present application, a method for network configuration is further provided. This method is implemented by a cleaning device, and includes:
  sending, by the cleaning device, a second Bluetooth MAC address of the cleaning device to a base station, and generating network configuration prompt information by the base station; the network configuration prompt information is used to prompt a user terminal to establish a first Bluetooth connection with the base station, and the user terminal is configured to send wireless connection information to the base station through the first Bluetooth connection, in order that the base station accesses a wireless network according to the wireless connection information and uploads the second Bluetooth MAC address to a server through the wireless network;
  establishing, by controlling the cleaning device, a second Bluetooth connection with the user terminal, and sending, by the user terminal, the wireless connection information to the cleaning device through the second Bluetooth connection; and
  accessing the wireless network by the cleaning device according to the wireless connection information.

Furthermore, before said sending the second Bluetooth MAC address of the cleaning device to the base station, the method further includes:
  obtaining, by the cleaning device, a network configuration start command sent by the base station; and
  obtaining, by the cleaning device, the second Bluetooth MAC address according to the network configuration start command.

In accordance with the third aspect of the embodiments of the present application, a method of network configuration is further provided. This method is implemented by a user terminal, and includes:

establishing, by controlling the user terminal, a first Bluetooth connection with a base station;

sending, by the user terminal, wireless connection information to the base station through the first Bluetooth connection, accessing, by the base station, a wireless network according to the wireless connection information and uploading, by the base station, a second Bluetooth MAC address of a cleaning device to a server through the wireless network; the second Bluetooth MAC address is sent by the cleaning device to the base station;

accessing the server to obtain the second Bluetooth MAC address by the user terminal;

establishing, by controlling the user terminal a second Bluetooth connection with the second device according to the second Bluetooth MAC address; and sending, by the user terminal, the wireless connection information to the cleaning device through the second Bluetooth connection, and accessing the wireless network by the cleaning device, according to the wireless connection information.

Furthermore, said accessing the server to obtain the second Bluetooth MAC address by the user terminal includes:

accessing the server by the user terminal by polling according to a preset frequency to obtain the second Bluetooth MAC address.

In accordance to the fourth aspect of the embodiments of the present application, a non-transitory computer readable storage medium is further provided. The non-transitory computer readable storage medium stores a computer-executable instruction, that, when executed by an electronic device, causes the electronic device to perform the aforesaid method for network configuration.

According to the fifth aspect of the embodiments of the present application, a base station is further provided. The base station includes:
a first interaction module;
a first Bluetooth module;
a first wireless fidelity (Wi-Fi) module;
a first wireless module;
a first memory; and
a first processor being in communication connection with the first interaction module, the first Bluetooth module, the first Wi-Fi module, the first wireless module, and the first memory, respectively.

The first memory stores an instruction, that, when executed by the first processor, causes the first processor to perform the aforesaid method for network configuration.

According to the sixth aspect of the embodiments of the present application, a cleaning device is further provided. The cleaning device includes:
a second interaction module;
a second Bluetooth module;
a second wireless fidelity (Wi-Fi) module;
a second wireless module;
a second memory; and
a second processor being in communication connection with the second interaction module, the second Bluetooth module, the second Wi-Fi module, the second wireless module, and the second memory, respectively.

The second memory stores an instruction, that, when executed by the second processor, causes the second processor to perform the aforesaid method for network configuration.

According to the seventh aspect of the embodiments of the present application, a cleaning system is further provided. The cleaning system includes the base station and the cleaning device, and the base station is in communication connection with the cleaning device.

According to the eighth aspect of the embodiments of the present application, a user terminal is further provided. The user terminal includes:
a third interaction module;
a remote communication module configured to be in communication connection with a server;
a third Bluetooth module;
a third memory; and
a third processor being in communication connection with the third interaction module, the remote communication module, the third Bluetooth module, and the third memory, respectively;
the third memory stores an instruction, that, when executed by the third processor, causes the third processor to perform the aforesaid method for network configuration.

DESCRIPTION OF THE DRAWINGS

One or a plurality of embodiment(s) is/are illustrated as examples according to the corresponding accompanying drawings, and these exemplified illustrations do not constitute as limitations to the embodiments. Elements having the same reference numeral in the drawings represent similar elements, unless otherwise these elements having the same reference numeral are specifically defined. The figures in the drawings do not constitute as limitation of proportion.

DETAILED DESCRIPTION OF EMBODIMENTS

In order to make the objective, the technical solutions, and the advantages of the present invention be clearer and more understandable, the present invention is further described in detail with reference to the accompanying figures and the embodiments. It should be understood that, the specific embodiments described herein are only intended to explain the present invention rather than limiting the present invention. Based on the embodiments in the present invention, all other embodiments which are obtained by the one of ordinary skill in the art without paying creative efforts should all be included in the protection scope of the present invention.

It should be noted that, the various features in the embodiments of the present invention can be combined with each other without confliction, and any combination of these features is included within the scope of protection of the present invention. In addition, although functional modules are divided in the schematic diagram of the device, and the logical order is shown in the flow diagrams, in some conditions, the steps shown or described can be performed through a dividing of the modules different from the dividing of the modules in the device or in an order different from the orders in the flow diagrams. Furthermore, the expressions such as "first", "second" and "third" used in the present invention are not intended to limit the order of data and the order of execution. Instead, these expressions are only used to differentiate identical or similar items which have essentially the same functions and effects.

Figure 1:
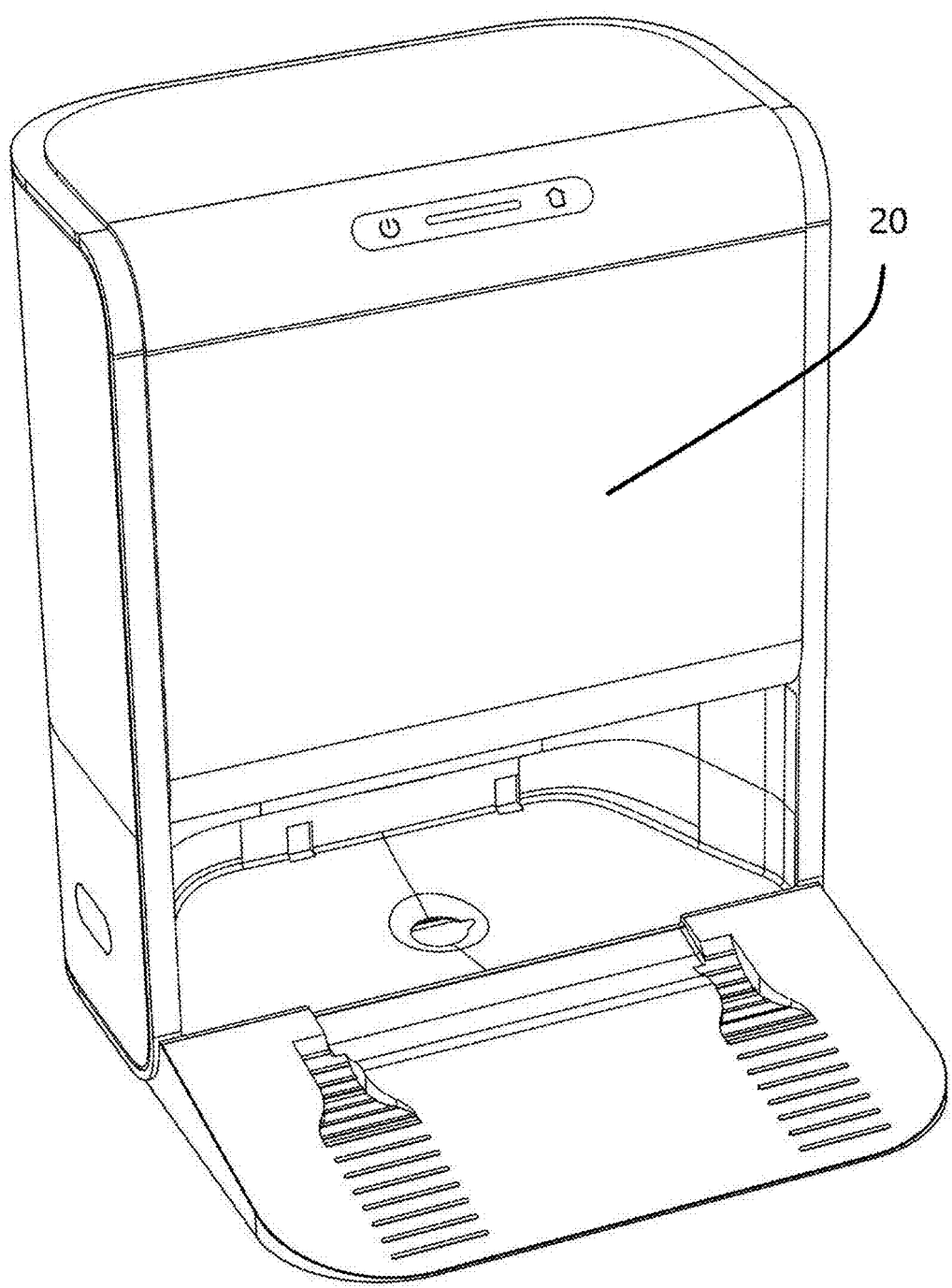
FIG. 1 illustrates a schematic structural diagram of a cleaning system in accordance with one embodiment of the present invention.

A cleaning system is provided in the embodiments of the present application. As shown in FIG. 1, the cleaning system 10 includes a base station 20 and a cleaning device 30. The base station 20 is in communication connection with the cleaning device 30.

The base station 20 is configured to maintain the cleaning device 30. Correspondingly, the base station 20 can provide maintenance services including charging, mop cleaning, garbage removal for the cleaning device 30.

Figure 2:
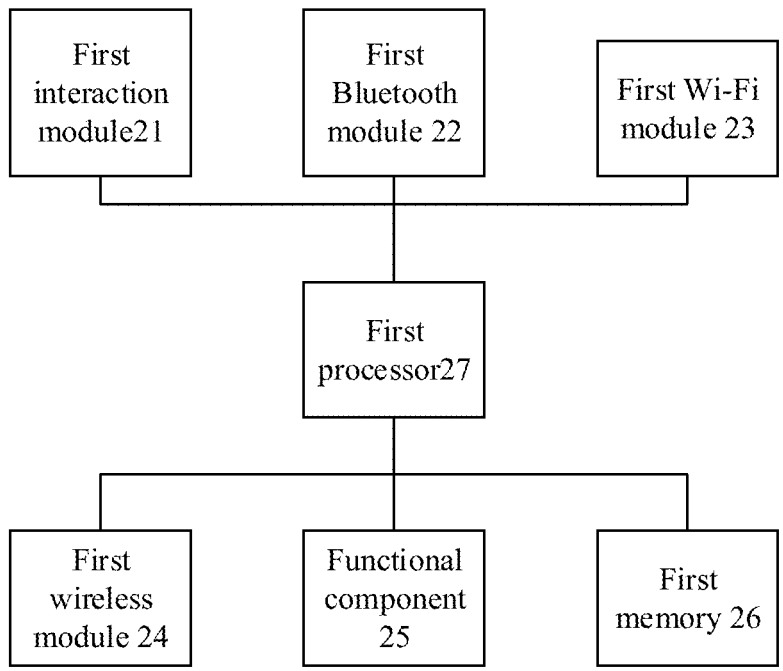
FIG. 2 illustrates a schematic structural diagram of a base station shown in FIG. 1.

Referring to FIG. 2, the base station 20 includes a first interaction module 21, a first Bluetooth module 22, a first wireless fidelity (Wi-Fi) module 23, a first wireless module 24, a functional component 25, a first memory 26, and a first processor 27.

The first interaction module 21 is in communication connection with the first processor 27, and is configured to provide a user with a function of interacting with the base station 20. Where the method of interaction with the base station 20 includes one or more than two of interaction manners including: key interaction, touch interaction, voice interaction, and light interaction.

In some embodiments, the first interaction module 21 includes a first physical button circuit which is mounted on a surface of a housing of the base station 20 and is electrically connected to the first processor 27. The first physical button circuit is configured to generate a physical button command in response to detecting a physical button pressing operation of the user. The first processor 27 is configured to perform a corresponding network configuration operation according to the physical button command.

In some embodiments, the first interaction module 21 includes a first touch module mounted on the surface of the housing of the base station 20 and electrically connected to the first processor 27. The first touch module is configured to generate a touch key command in response to detecting a key touching operation of the user, and the first processor 27 performs the corresponding network configuration operation according to the touch key command.

In some embodiments, the first interaction module 21 includes a first speaker mounted on the base station 20 and electrically connected to the first processor 27. The first speaker is configured to be controlled by the first processor 27 to generate voice prompt information associated with the network configuration operation.

In some embodiments, the first interaction module 21 includes a first light-emitting diode (LED) circuit, and the first LED circuit is mounted on a housing surface of the base station 20 and is electrically connected to the first processor 27. The first LED circuit is configured to be controlled by the first processor 27 to generate light prompt information associated with the network configuration operation.

The first Bluetooth module 22 is in communication connection with the first processor 27 and is configured to establish a Bluetooth connection with the user terminal or the cleaning device 30. The first Bluetooth module 22 is configured with a first Bluetooth media access control (MAC) address. The first processor 27 may read the first Bluetooth MAC address of the first Bluetooth module 22. The first Bluetooth module 22 supports any suitable Bluetooth protocol, such as classic Bluetooth protocol, low-power Bluetooth protocol, or the like.

The first Wi-Fi module 23 is in communication connection with the first processor 27 and is configured to establish a Wi-Fi connection with the user terminal or the cleaning device 30 or an external router. The first Wi-Fi module 23 is configured with a first Wi-Fi_MAC address. The first processor 27 may read the first Wi-Fi_MAC address of the first Wi-Fi module 23. The first Wi-Fi module 23 supports any suitable Wi-Fi protocol, such as Wi-Fi protocol 5, Wi-Fi protocol 6, or the like.

It can be understood that the first Bluetooth module 22 and the first Wi-Fi module 23 can be integrated onto one single communication chip. For example, a Bluetooth and Wi-Fi integrated module with a frequency band of 2.4G in the market is provided with a Bluetooth function and a Wi-Fi function.

The first wireless module 24 is in communication connection with the first processor 27 and is configured to communicate with the cleaning device 30. The first wireless module 24 may adopt a wireless module with a frequency of 433 MHZ or a ZigBee module.

The functional component 25 is in communication connection with the first processor 27 and is configured to perform functional operations possessed by the base station 20. The functional operation includes a charging operation, a mop cleaning operation, a garbage removal operation, a purified liquid supplying operation, disinfection and sterilization operation, or a mop drying operation.

In some embodiments, the functional component 25 includes a charging circuit. The charging circuit is in communication connection with the first processor 27 and is configured to supply power for the cleaning device 30.

In some embodiments, the functional component 25 includes a motor module and a rubbing strip. The rubbing strip is connected to an output shaft of the motor module. The motor module is in communication connection with the first processor 27 and is configured to drive the rubbing strip to clean the garbage carried by the cleaning device 30.

In some embodiments, the functional component 25 includes a garbage removal component, and the garbage removal component is in communication connection with the first processor 27 and is configured to extract garbage collected by the cleaning device 30. The garbage includes solid waste and dirty liquid.

In some embodiments, the functional component 25 includes a purified liquid supply component, and the purified liquid supply component is in communication connection with the first processor 27 and is configured to provide purified liquid for the cleaning device 30.

In some embodiments, the functional component 25 includes a drying component. The drying component is in communication connection with the first processor 27 and is configured to dry the mop of the cleaning device 30.

The first memory 26 is in communication connection with the first processor 27. The first memory 26 stores an instruction executable by the first processor 27. When the instruction is executed by the first processor 27, the first processor 27 is caused to perform the method for network configuration set forth below.

The first processor 27 serves as a control core of the base station 20.

The cleaning device 30 is configured to perform a cleaning operation. The cleaning device 30 may be applied to any suitable service scenario, such as scenarios of sweeping, mopping, floor washing, dust collection, and a cleaning robot 200 may be configured to be in any suitable shape and have function to adapt to the corresponding service scenario. The cleaning device 30 includes but is not limited to a sweeping robot, a dust collecting robot, a mopping robot, or a floor washing robot.

Figure 3:
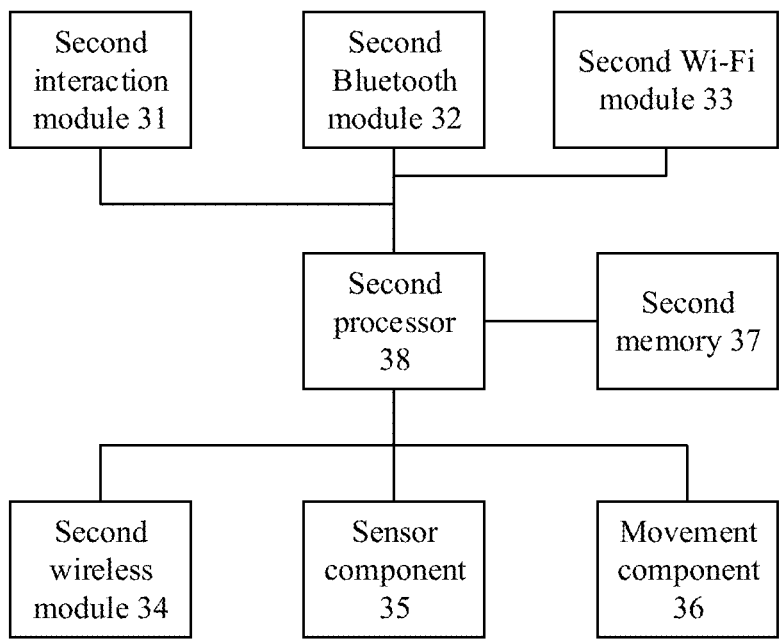
FIG. 3 illustrates a schematic structural diagram of a cleaning device shown in FIG. 1.

Referring to FIG. 3, the cleaning device 30 includes a second interaction module 31, a second Bluetooth module 32, a second Wi-Fi module 33, a second wireless module 34, a sensor component 35, a drive component 36, a second memory 37, and a second processor 38.

The second interaction module 31 is in communication connection with the second processor 38, and is configured to provide a user with a function of interacting with the cleaning device 30. The method of interacting with the cleaning device 30 includes one or more than two of the following interaction methods: key interaction, touch interaction, voice interaction, and light interaction.

In some embodiments, the second interaction module 31 includes a second physical button circuit, and the second physical button circuit is mounted on the surface of the housing of the cleaning device 30 and is electrically connected to the second processor 38. The second physical button circuit is configured to generate a physical button command in response to detecting a physical button pressing operation of the user. The second processor 38 is configured to perform corresponding cleaning operation according to the physical button command.

In some embodiments, the second interaction module 31 includes a second touch module. The second touch module is mounted on the surface of the housing of the cleaning device 30 and is electrically connected to the second processor 38. The second touch module is configured to generate a touch key command in response to detecting a key touching operation of the user. The second processor 38 is configured to perform corresponding cleaning operation according to the touch key command.

In some embodiments, the second interaction module 31 includes a second speaker mounted on the cleaning device 30 and electrically connected to the second processor 38. The second speaker is configured to be controlled by the second processor 38 to generate voice prompt information associated with the cleaning operation.

In some embodiments, the second interaction module 31 includes a second light-emitting diode (LED) circuit. The second LED circuit is mounted on the surface of the housing of the cleaning device 30 and is electrically connected to the second processor 38. The second LED circuit is configured to be controlled by the second processor 38 to generate light prompt information associated with the cleaning operation.

The second Bluetooth module 32 is in communication connection with the second processor 38 and is configured to establish the Bluetooth connection with the user terminal or the base station 20. The second Bluetooth module 32 is configured with a second Bluetooth MAC address, and the second processor 38 can read the second Bluetooth MAC address of the second Bluetooth module 32. The second Bluetooth module 32 supports any suitable Bluetooth protocol, such as the classic Bluetooth protocol, the low-power Bluetooth protocol, or the like.

The second Wi-Fi module 33 is in communication connection with the second processor 38 and is configured to establish a Wi-Fi connection with the user terminal or the base station 20 or the external router. The second Wi-Fi module 33 is configured with a second Wi-Fi_MAC address, and the second processor 38 can read the second Wi-Fi_MAC address of the second Wi-Fi module 33. The second Wi-Fi module 33 supports any suitable Wi-Fi protocol, such as the Wi-Fi protocol 5 or the Wi-Fi protocol 6. It can be understood that, the second Bluetooth module 32 and the second Wi-Fi module 33 can be integrated onto one single communication chip. For example, a Bluetooth and Wi-Fi integrated module with a frequency band of 2.4G in the market is provided with a Bluetooth function and a Wi-Fi function.

The second wireless module 34 is in communication connection with the second processor 27 and is configured to communicate with the base station 20. The second wireless module 24 may adopt the wireless module with the frequency of 433 MHZ or a ZigBee module.

The second wireless module 34 is in communication connection with the second processor 38 for communication by the base station 20. The second wireless module 34 may adopt a 433M wireless module or a ZigBee module.

The sensor component 35 is in communication connection with the second processor 38 and is configured to collect environmental data of the environment where the cleaning device 30 is located. The second processor 38 is configured to perform a map building operation, a cleaning partitioning operation, a cleaning path planning operation, an obstacle avoidance operation, or a navigation operation according to the environment data.

In some embodiments, the sensor component 35 includes various suitable sensors, such as an inertial measurement unit, a gyroscope, a magnetometer, an accelerometer or a speedometer, a laser radar or an acoustic radar, or the like.

The drive component 36 is in communication connection with the second processor 38 and is configured to drive the cleaning device 30 to move ahead or move backwards. During a cleaning process, the second processor 38 sends a control instruction to the drive component 36, in order that the drive component 36 drives the cleaning device 30 to complete a cleaning task according to the control instruction.

The second memory 37 is in communication connection with the second processor 38. The second memory 37 stores an instruction executable by the second processor 38. When the instruction is executed by the second processor 38, the second processor 38 is caused to perform the method for network configuration set forth below.

The second processor 38 serves as a control core of the cleaning device 30. Both the second processor 38 and the first processor 27 can be a general purpose processor, a digital signal processor (DSP), an application specific integrated circuit (ASIC), a field programmable gate array (FPGA), a single chip microcomputer, advanced RISC machine (ARM) or other programmable logic device, a discrete gate or transistor logic, a discrete hardware component, or any combination of these components.

In this embodiment, when the base station 20 communicates with the cleaning device 30, the base station 20 may communicate with the second wireless module 34 through the first wireless module 24. During network configuration, the first wireless module 24 of the base station 20 establishes a wireless connection with the second wireless module 34 of the cleaning device 30 automatically. As an alternative, the first wireless module 24 of the base station 20 can also establish a wireless connection with the second wireless module 34 of the cleaning device 30 under the control of the user.

Figure 4:
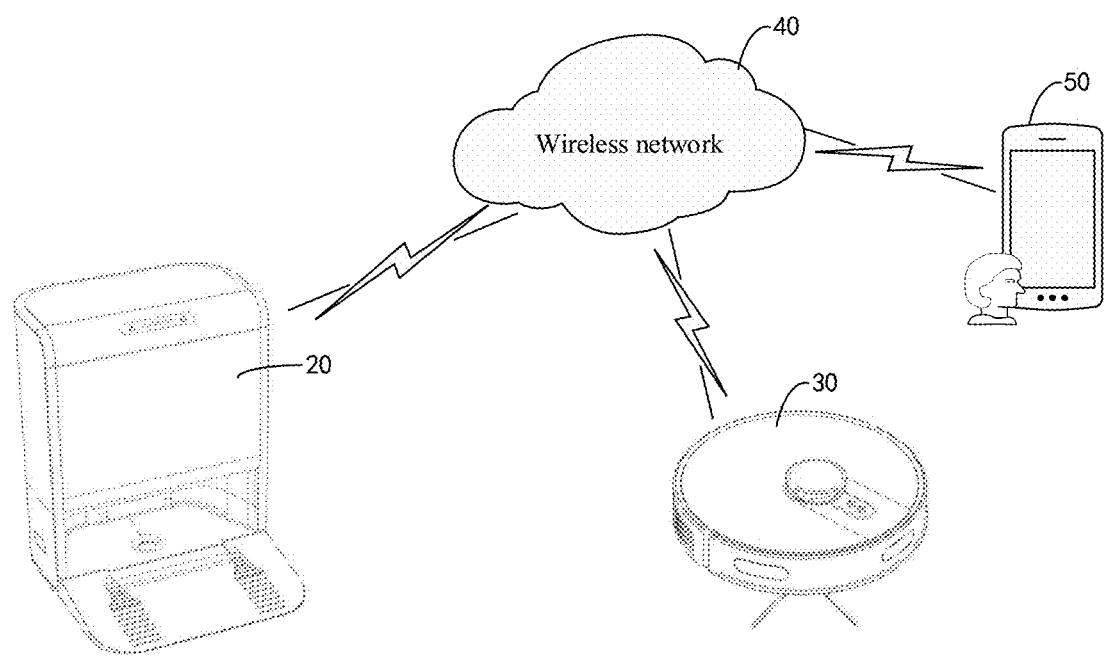
FIG. 4 illustrates a schematic structural diagram of the cleaning system in accordance with another embodiment of the present invention.

In some embodiments, the base station 20 and the cleaning device 30 in this embodiment may be connected to a wireless network 40 through network configuration operation. In some embodiments, referring to FIG. 4, the cleaning system 10 further includes a user terminal 50. The user terminal 50 can communicate with the base station 20 and the cleaning device 30 through the wireless network 40, so as to control the base station 20 and the cleaning device 30 remotely.

The operating system of the user terminal 50 is provided with a cleaning APP. The cleaning APP is configured to perform the following functions: activating the Bluetooth module of the user terminal 50; controlling a Bluetooth module of the user terminal 50 to establish a Bluetooth connection with the first Bluetooth module 22 or the second Bluetooth module 32; parsing a Wi-Fi account and a Wi-Fi password of the Wi-Fi connected to the user terminal 50, in order to control a service logic operation of the cleaning device 30.

Figure 5:
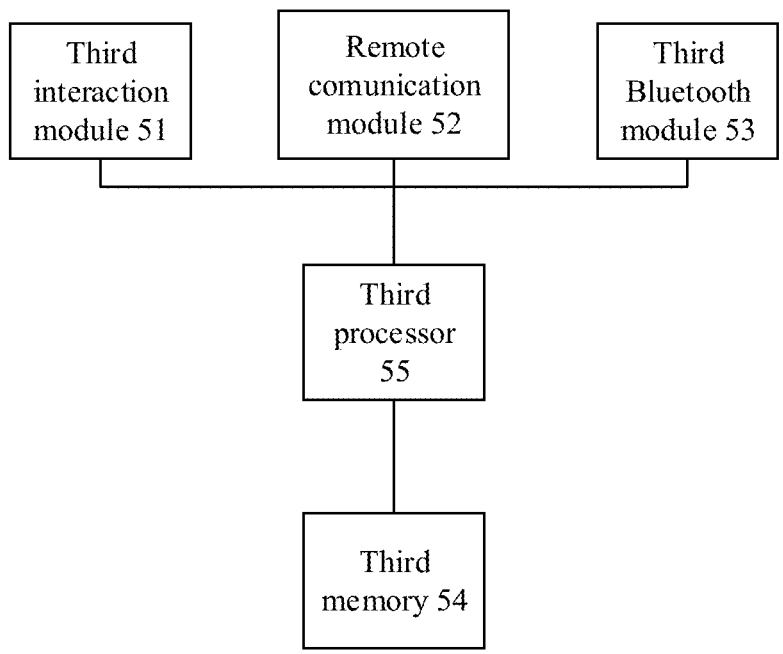
FIG. 5 illustrates a schematic structural diagram of a user terminal shown in FIG. 4.

Referring to FIG. 5, the user terminal 50 includes a third interaction module 51, a remote communication module 52, a third Bluetooth module 53, a third memory 54, and a third processor 55.

The third interaction module 51 is in communication connection with the third processor 55, and is configured to provide an interactive interface for the user. In some embodiments, the third interaction module 51 includes a physical button circuit, a touch module, a loudspeaker, and an LED circuit.

The remote communication module 52 is in communication connection with the third processor 55 and is configured to be in communication connection with the server. In some embodiments, the remote communication module 52 may be a second generation mobile communication technology (2G) communication module, a third generation mobile communication technology (3G) communication module, a fourth generation mobile communication technology (4G) communication module, a fifth generation mobile communication technology (5G) communication module, or a global system for mobile communications (GSM) communication module.

The third Bluetooth module 53 is in communication connection with the third processor 55 and is configured to establish a Bluetooth connection with the first Bluetooth module 22 or the second Bluetooth module 32.

The third memory 54 is in communication connection with the third processor 55. The third memory 54 stores an instruction executable by the third processor 55. When the instruction is executed by the third processor 55, the third processor 55 is caused to perform the method of network configuration for device set forth below.

In some embodiments, the user terminal 50 is a mobile phone, a desktop computer, a laptop computer, a tablet computer, a smart watch, or a mobile terminal, or the like.

Figure 6:
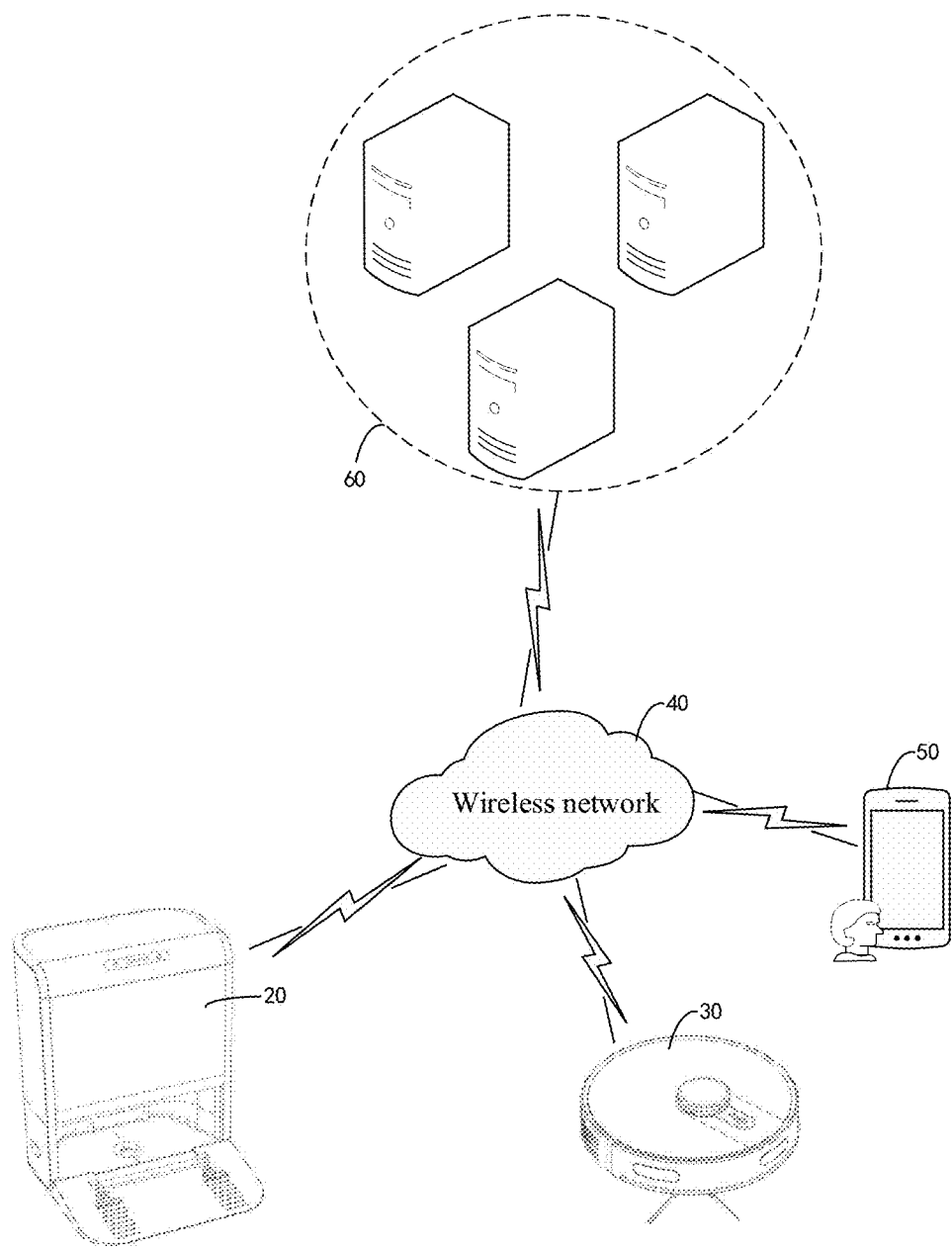
FIG. 6 illustrates a schematic structural diagram of the cleaning system in accordance with yet another embodiment of the present invention.

In some embodiments, referring to FIG. 6, the cleaning system 10 further includes a server 60. The server 60 can communicate with the base station 20, the cleaning device 30 and the user terminal 50 through the wireless network 40.

Figure 7:
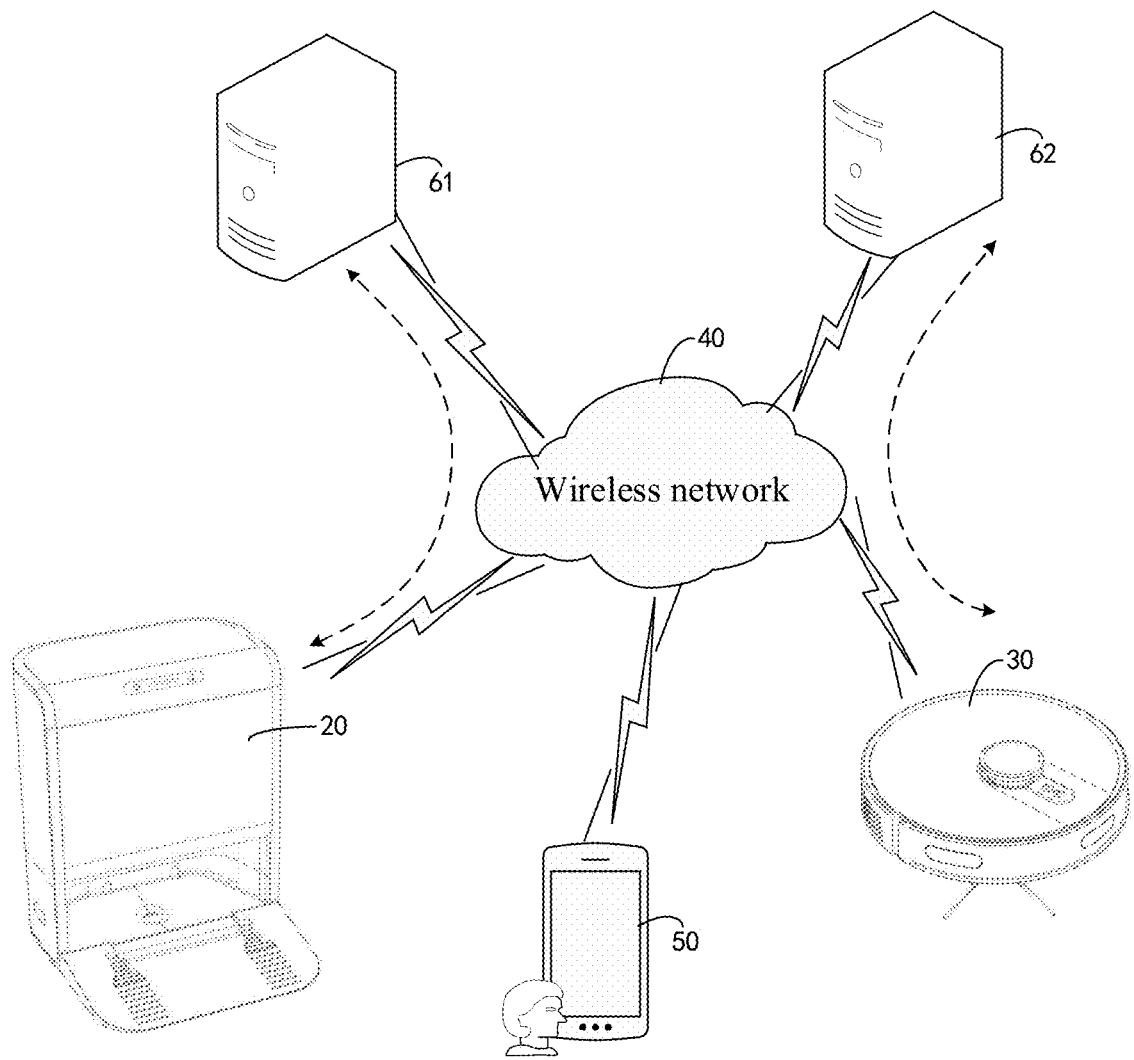
FIG. 7 illustrates a schematic structural diagram of the cleaning system in accordance with another embodiment of the present invention.

In some embodiments, referring to FIG. 7, the server 60 includes a first cloud server 61 and a second cloud server 62. The first cloud server 61 is in communication connection with the base station 20 through a wireless network, the second cloud server 62 is in communication connection with the cleaning device 30 and the user terminal 50 through the wireless network, respectively. The first cloud server 61 is configured to dock with the base station 20 and provide various logic functions for the base station 20. The second cloud server 62 is configured to dock with the cleaning device 30 and provide various logic functions for the cleaning device 30. The user terminal 50 can be registered on the second cloud server 62 to obtain a user account USERID. Then, the second cloud server 62 binds the user account USERID with device information UUID of the cleaning device 30.

Figure 8:
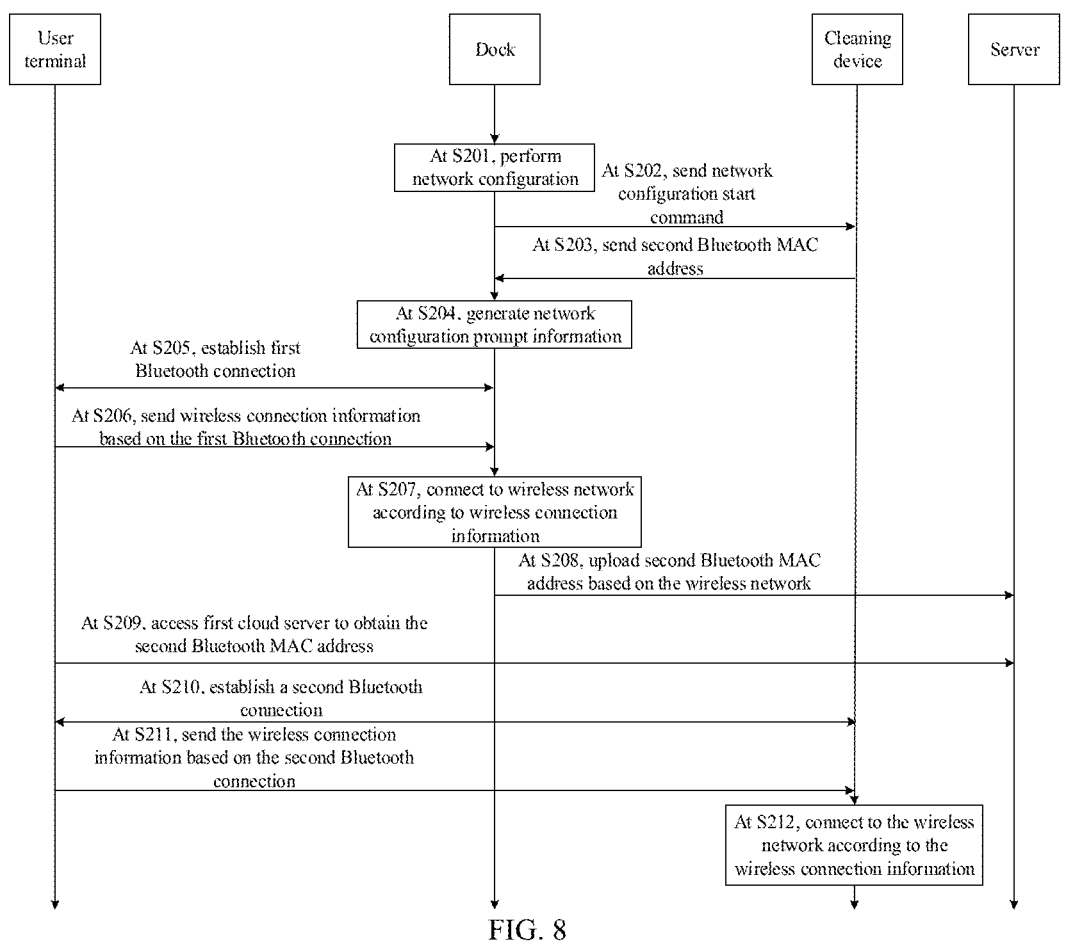
FIG. 8 illustrates a schematic flow diagram of performing network configuration for the base station and the cleaning device in accordance with the embodiment of the present invention, with the participation of the user terminal.

In order to describe the method for network configuration provided in the embodiments of the present invention in detail, this method is described in detail according to the embodiments of the present invention with reference to FIG. 8. The process of method for network configuration includes the following steps:

At step S201, the user triggers the base station 20 to perform a network configuration operation.

In the step of S201, the user presses the physical button circuit of the base station 20, the physical button circuit generate a network configuration trigger command in response to detecting the physical button pressing operation of the user. Then, the base station 20 detects whether the first wireless module performs communication normally. If the communication of the first wireless module is normal, a step S202 is entered. If the communication of the wireless module is abnormal, the network configuration operation is terminated.

At step S202, the base station 20 sends a network configuration start command to the cleaning device 30.

In the step of S202, the cleaning device 30 is configured to: activate the second Bluetooth module according to the network configuration start command; obtain the second Bluetooth MAC address of the second Bluetooth module; detect whether the second Bluetooth MAC address is correct; perform a step S203 if the second Bluetooth MAC address is correct, or send information indicating network configuration failure to the base station 20 through the second wireless module in order that the base station 20 terminates the network configuration operation according to the information indicating network configuration failure, if the second Bluetooth MAC address is incorrect.

At the step S203, the cleaning device 30 sends the second Bluetooth MAC address to the base station 20.

In the step of S203, when the second Bluetooth MAC address is received by the base station 20, the second Bluetooth MAC address is saved and a step of S204 is entered.

At the step S204, the base station 20 generates network configuration prompt information.

In the step of S204, the base station 20 controls the first interaction module to generate the network configuration prompt information. The network configuration prompt information is used to prompt the user terminal to establish a first Bluetooth connection with the base station 20. The network configuration prompt information may be voice prompt information, light prompt information, short message prompt information, and the like.

At step S205, the user terminal establishes the first Bluetooth connection with the base station 20.

At the step of S205, after the user is prompted of the network configuration prompt information, the user terminal is used to start the cleaning APP, and the cleaning APP automatically searches the Bluetooth of the base station 20 and establishes a first Bluetooth connection with the base station 20. After the user terminal establishes the first Bluetooth connection with the base station 20, step S205 is entered.

At step S206, the user terminal sends wireless connection information to the base station 20 based on the first Bluetooth connection.

In the step of S206, the wireless connection information includes a Wi-Fi account and a Wi-Fi password. When the cleaning APP of the user terminal detects that the first Bluetooth connection has been established, the cleaning APP obtains the Wi-Fi account and the Wi-Fi password of the wireless network according to the wireless network connected to the user terminal, and packages the Wi-Fi account and the Wi-Fi password into the wireless connection information, and sends the wireless connection information to the base station 20.

At step S207, the base station 20 connects to the wireless network according to the wireless connection information.

In the step of S207, the base station 20 parses the Wi-Fi account and the Wi-Fi password from the wireless connection information, automatically connects to the wireless network according to the Wi-Fi account and the Wi-Fi password. A step of S208 is entered.

At the step S208, the base station 20 uploads the second Bluetooth MAC address to the server through the wireless network.

In the step of S208, when the base station 20 detects that the wireless network is successfully connected, the base station 20 uploads the second Bluetooth MAC address to the server, and a step S209 is entered. In one embodiment, the server is the first cloud server.

At the step S209, the user terminal accesses the server to obtain the second Bluetooth MAC address.

In the step of S209, in some embodiments, the user terminal accesses the server by polling according to a preset frequency so as to obtain the second Bluetooth MAC address. In some embodiments, when the base station 20 uploads the second Bluetooth MAC address to the server, the base station 20 broadcasts information indicating that the second Bluetooth MAC address is uploaded successfully through the first Bluetooth module. When the user terminal monitors the information indicating that the second Bluetooth MAC address is uploaded successfully through the first Bluetooth connection, the user terminal starts to access the server to obtain the second Bluetooth MAC address.

As compared to the method of broadcasting the second Bluetooth MAC address so as to be monitored by the user terminal, since this method is arbitrary, it is not prone to quickly hit the second Bluetooth MAC address in a short time to facilitate network configuration, in this embodiment, the user terminal directionally accesses the server to obtain the second Bluetooth MAC address, such that the network configuration operation can be reliably and quickly performed subsequently.

At step S210, a second Bluetooth connection between the user terminal and the cleaning device 30 is established based on the second Bluetooth MAC address.

At step S211, the user terminal sends the wireless connection information to the cleaning device 30 through the second Bluetooth connection.

At step S212, the cleaning device 30 connects to the wireless network according to the wireless connection information.

In the step of S212, when the cleaning device 30 is successfully connected to the wireless network, the cleaning device 30 sends information indicating that the network configuration is successful to the base station 20.

In conclusion, it can be seen from the above steps that the user only needs to use the user terminal to start the cleaning APP according to the network configuration prompt information in the step S204, after the first Bluetooth connection between the user terminal and the base station 20 is established, other steps can be performed without the participation of the user, automatic network configuration for the cleaning device 30 and the base station 20 can be realized in the background directly. Thus, the automatic network configuration for the cleaning device 30 and the base station 20 can be realized by the user by only performing a single-click. In this way, an efficiency of network configuration for connecting the cleaning device 30 and the base station 20 to the wireless network can be improved.

Figure 9:
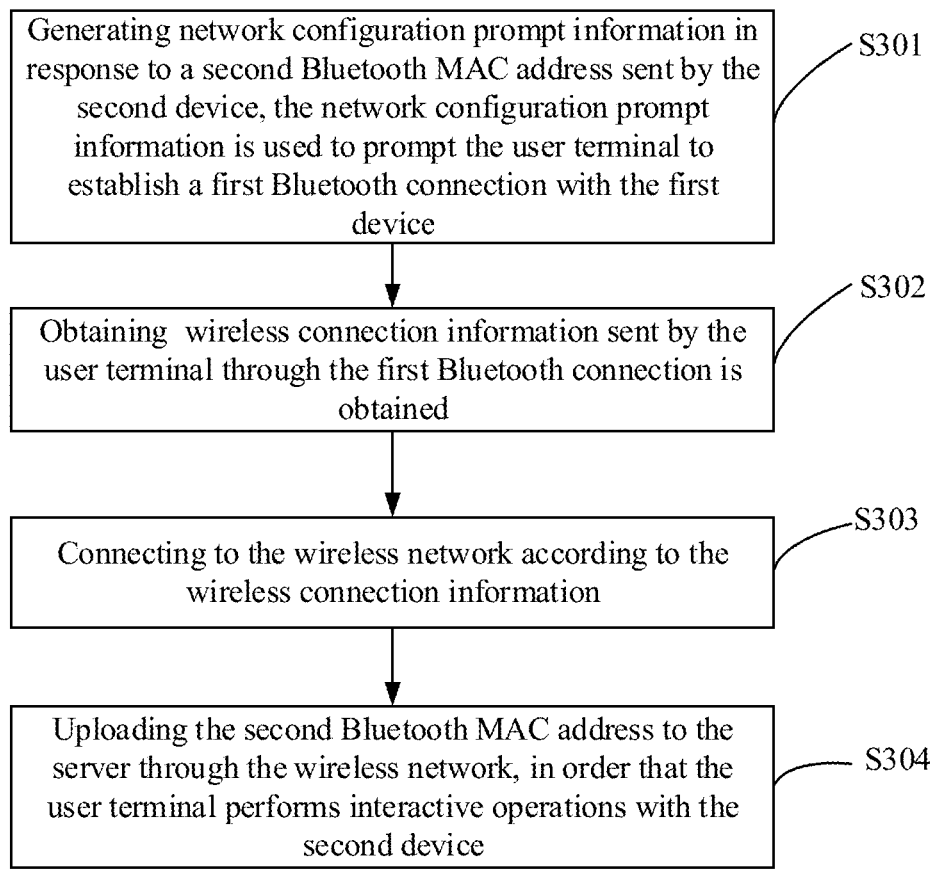
FIG. 9 illustrates a schematic flow diagram of a method for performing network configuration for a device provided by one embodiment of the present invention; where a subject of execution of the method for performing network configuration for the device is a first device.

According to another aspect of the embodiments of the present invention, another method for network configuration is further provided in the embodiments of the present invention. This method is applied to a first device. In one embodiment, the first device is an Internet of Things (IoT) device. In a cleaning scenario, the first device may be used as the base station 20. Referring to FIG. 9, the method for network configuration includes the following steps:

At step S301, network configuration prompt information is generated in response to receiving a second Bluetooth MAC address sent by the second device. The network configuration prompt information is used to prompt the user terminal to establish a first Bluetooth connection with the first device.

At step S302, wireless connection information sent by the user terminal through the first Bluetooth connection is obtained.

At step S303, the first device connects to the wireless network according to the wireless connection information.

At step S304, the second Bluetooth MAC address is uploaded to the server through the wireless network, in order that the user terminal performs interactive operations with the second device.

In the step of S304, the interactive operations include: the operation of establishing a second Bluetooth connection between the user terminal and the second device according to the second Bluetooth MAC address; and the operation of sending, by the user terminal, the wireless connection information to the second device through the second Bluetooth connection, in order that the second device connects to the wireless network according to the wireless connection information.

In conclusion, when network configuration needs to be performed for the first device and the second device, the user only needs to perform a single-click to enable the user terminal to establish the first Bluetooth connection with the first device, which allows the first device and the second device to connect to the wireless network by communicating with the user terminal automatically, thereby achieving an objective of single-click based network configuration. Thus, an efficiency of network configuration for connecting the first device and the second device to the wireless network can be improved.

In some embodiments, before generating the network configuration prompt information, the method for network configuration further includes the following steps: sending the network configuration start command to the second device in response to receiving the network configuration trigger command, in order that the second device obtains the second Bluetooth MAC address according to the network configuration start command.

Figure 10:
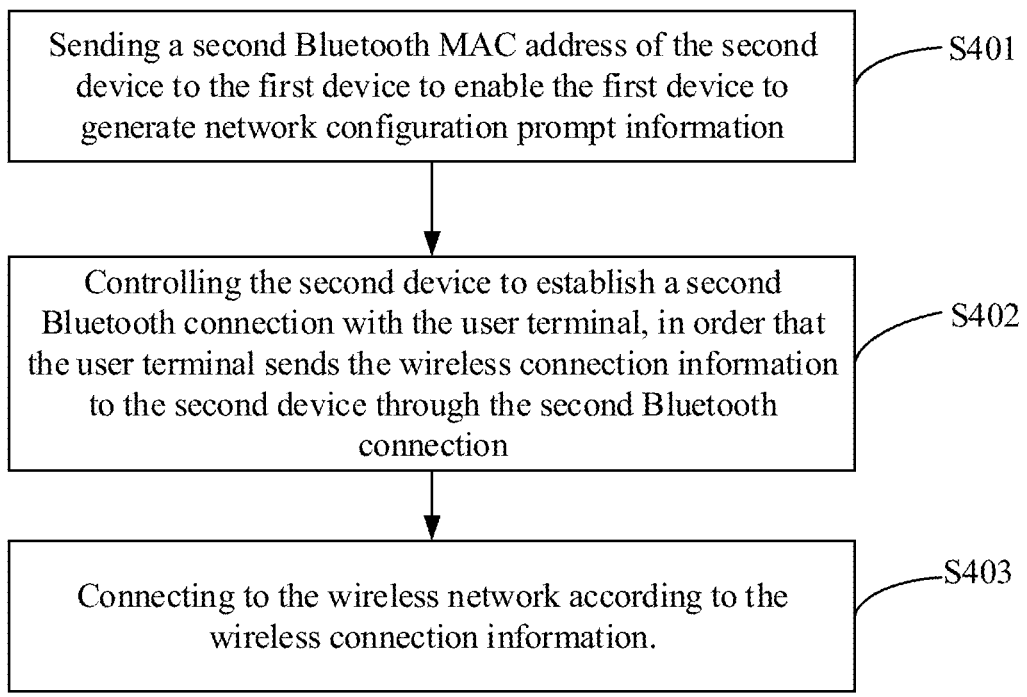
FIG. 10 illustrates a schematic flow diagram of a method for performing network configuration for a device in accordance with one embodiment of the present invention; where a subject of execution of the method for performing network configuration for the device is a second device.

According to another aspect of the embodiments of the present invention, another method for network configuration is further provided in the embodiments of the present invention. This method is applied to the second device. Where the second device is an Internet of Things (IoT) device. In a cleaning scenario, the second device may be used as the cleaning device 30. Referring to FIG. 10, the method for network configuration includes the following steps:

At step S401, a second Bluetooth media access control (MAC) address of the second device is sent to the first device to enable the first device to generate network configuration prompt information.

In the step of S401, the network configuration prompt information is used to prompt the user terminal to establish a first Bluetooth connection with the first device, and the user terminal may send the wireless connection information to the first device based on the first Bluetooth connection, so that the first device connects the wireless network according to the wireless connection information and uploads the second Bluetooth MAC address to the server based on the wireless network.

At step S402, the second device is controlled to establish a second Bluetooth connection with the user terminal, in order that the user terminal sends the wireless connection information to the second device through the second Bluetooth connection.

At step S403, the second device connects to the wireless network according to the wireless connection information.

In some embodiments, before sending the second Bluetooth MAC address of the second device to the first device, the method for network configuration further includes the following steps: obtaining a network configuration start command sent by the first device, and obtaining the second Bluetooth MAC address according to the network configuration starting command.

Figure 11:
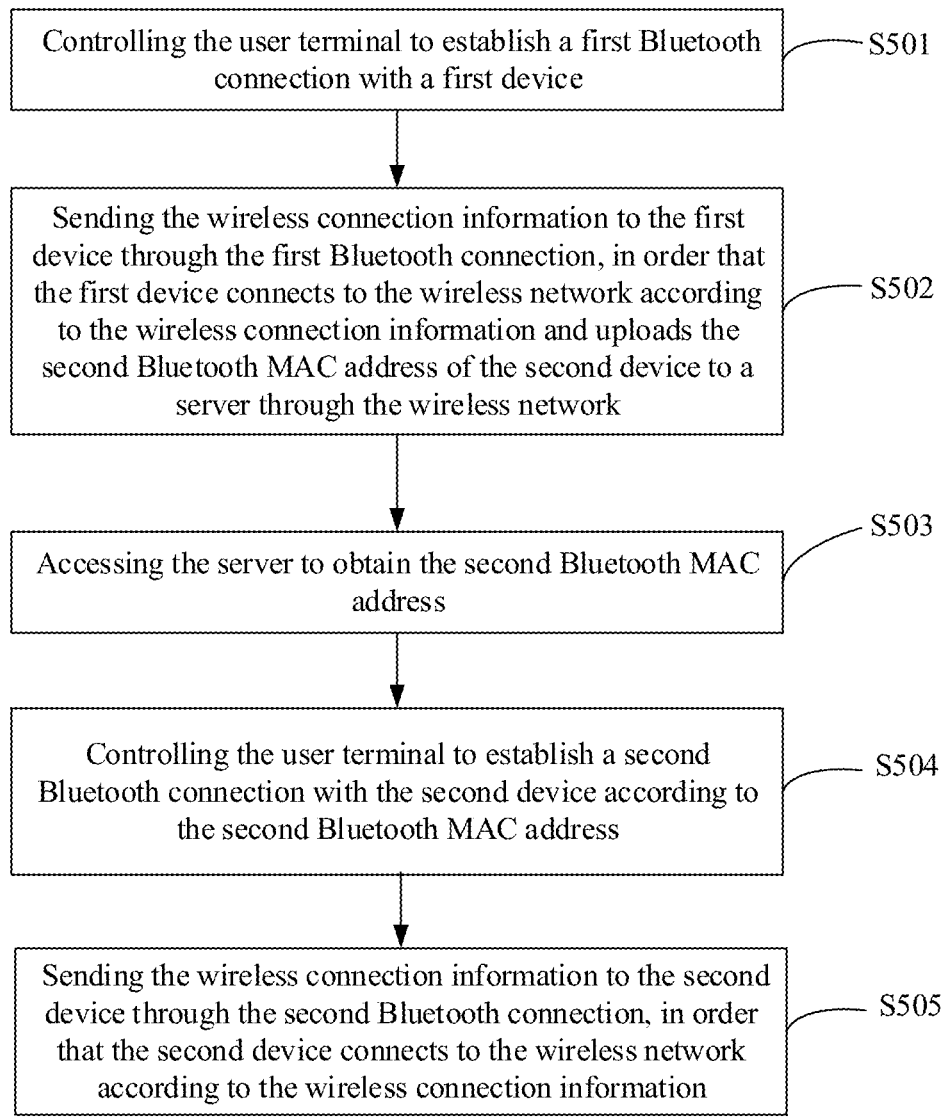
FIG. 11 illustrates a schematic flow diagram of a method for performing network configuration for a device in accordance with one embodiment of the present invention; where a subject of execution of the method for performing network configuration for the device is the user terminal.

According to another aspect of the embodiments of the present invention, another method for network configuration is provided in the embodiments of the present invention. This method is applied to a user terminal. Referring to FIG. 11, the method for network configuration includes the following steps:

At step S501, the user terminal is controlled to establish a first Bluetooth connection with a first device.

At step S502, the wireless connection information is sent to the first device through the first Bluetooth connection, in order that the first device connects to the wireless network according to the wireless connection information, and uploads the second Bluetooth MAC address of the second device to a server through the wireless network. The second Bluetooth MAC address is sent by the second device to the first device.

At step S503, the server is accessed and the second Bluetooth MAC address is obtained.

At step S504, the user terminal is controlled to establish a second Bluetooth connection with the second device according to the second Bluetooth MAC address.

At step S505, the wireless connection information is sent to the second device through the second Bluetooth connection, in order that the second device connects to the wireless network according to the wireless connection information.

In conclusion, when network configuration needs to be performed for the first device and the second device, the user only needs to perform a single-click to enable the user terminal to establish the first Bluetooth connection with the first device, which allows the first device and the second device to connect to the wireless network by communicating with the user terminal automatically, thereby achieving an objective of single-click based network configuration. Thus, an efficiency of network configuration for connecting the first device and the second device to the wireless network can be improved.

It should be noted that, in the foregoing various embodiments, the various steps are not necessarily in a certain order. A person of ordinary skill in the art may understand that the various steps can be performed in different orders of execution according to the descriptions of the embodiments of the present invention. That is, these various steps can be performed in parallel, and can also be performed alternatively, and the like.

Figure 12:
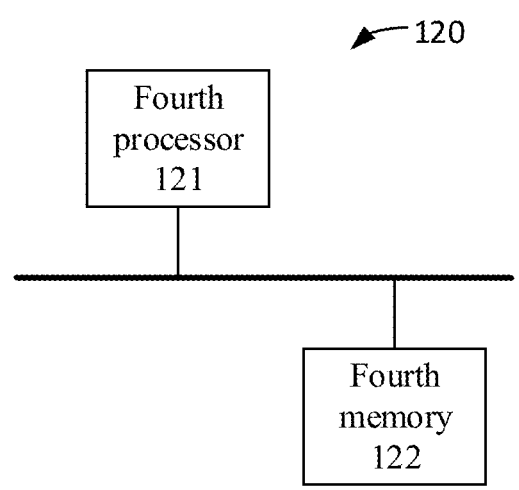
FIG. 12 illustrates a schematic diagram of a circuit configuration of an electronic device in accordance with one embodiment of the present invention.

Referring to FIG. 12, FIG. 12 illustrates a schematic diagram of a circuit configuration of an electronic device according to one embodiment of the present invention. As shown in FIG. 12, the electronic device 120 includes one or a plurality of fourth processors 121 and a fourth memory 122. One fourth processor 121 is taken as an example in FIG. 12.

The fourth processor 121 and the fourth memory 122 may be connected through a bus or in other manners. A connection between the fourth processor 121 and the fourth memory 122 through bus is taken as an example in FIG. 12.

The fourth memory 122 is a non-volatile non-transitory computer-readable storage medium, and can be configured to store non-volatile software programs, non-volatile computer-executable programs and modules, such as the program instructions/modules corresponding to the method for network configuration in the embodiments of the present invention. The fourth processor 121 implements the functions of the method for network configuration in accordance with the aforesaid method embodiments by operating the non-volatile software programs, the instructions and the modules stored in the fourth memory 122.

The fourth memory 122 may include a high-speed random access memory (RAM), and may further include a non-volatile memory, such as at least one magnetic disk storage device, a flash memory device, or other non-volatile solid-state memory device. In some embodiments, the fourth memory 122 may optionally include memories remotely arranged with respect to the fourth processor 121, and these remote memories can be connected to the fourth processor 121 through network. The instance of the network includes but is not limited to the Internet, an enterprise intranet, a local area network (LAN), a mobile communication network, and the combination thereof.

The program instructions/modules are stored in the fourth memory 122. When the program instructions/modules are executed by the one or plurality of fourth processor(s) 121, the method for network configuration in any one of the various method embodiments is performed.

A non-transitory computer readable storage medium is further provided in one embodiment of the present invention. The non-transitory computer readable storage medium stores a computer-executable instruction, that, when executed by one or a plurality of processors such as one fourth processor 121 in FIG. 12, causes the fourth processor 121 to perform the steps of method for network configuration in any one of the aforesaid method embodiments.

A computer program product is further provided in one embodiment of the present invention. The computer program product includes a computer program stored in the non-volatile non-transitory computer-readable storage medium. The computer program includes a program instruction, that, when executed by the electronic device, causes the electronic device to perform steps of the method for network configuration in any one of the aforesaid method embodiments.

According to the descriptions of the aforesaid embodiments, a person skilled in the art can clearly understand that the embodiments can be implemented in the manner of the combination of software and universal hardware platform. Certainly, the embodiments can also be implemented by hardware. Based on such understanding, the aforesaid technical solutions or the part that contributes to the related art may be embodied in the form of a software product essentially. This computer software product can be stored in the non-transitory computer-readable storage medium, such as a read only memory (ROM), a (random access memory) RAM, a magnetic disk, an optical disc, etc., and includes some instructions that enables a computer device (which may be a personal computer, a server, or a network device, etc.) to perform the method described in the various embodiments or in some parts of the embodiments.

It should be noted that, the aforesaid embodiments are only used to illustrate the technical solutions of the present invention, rather than limiting the technical solutions of the present invention. Under the idea of the present invention, the technical features in the aforesaid embodiments or different embodiments may also be combined, and the steps can be implemented in any order, many different changes in different aspects of the present invention can be made. These changes are not provided in detail for conciseness. Although the present invention has been described in detail with reference to the aforesaid embodiments, the person of ordinary skill in the art can understand that the technical solutions recited in the aforesaid various embodiments can also be modified, or some of the technical features in the various embodiments can be equivalently replaced. These modifications or replacements do not make the nature of the corresponding technical solutions to be deviated from the scope of the technical solutions of the embodiments of the present invention.

What is claimed is:

1. A method for network configuration, implemented by a base station, comprising:
   generating network configuration prompt information by the base station in response to receiving a second Bluetooth media access control (MAC) address sent by a cleaning device, and establishing a first Bluetooth connection between a user terminal and the base station in response to the network configuration prompt information;
   obtaining, by the base station, wireless connection information sent by the user terminal based on the first Bluetooth connection;
   connecting to a wireless network by the base station according to the wireless connection information; and
   uploading, by the base station, the second Bluetooth MAC address to a server through the wireless network, and performing, by the user terminal, an interactive operation with the cleaning device; wherein the interactive operation comprises: an operation of establishing, by the user terminal, a second Bluetooth connection operation with the cleaning device according to the second Bluetooth MAC address, and an operation of sending, by the user terminal, the wireless connection information to the cleaning device based on the second Bluetooth connection operation, in order that the cleaning device accesses the wireless network according to the wireless connection information.

2. The method according to claim 1, further comprising: sending, by the base station, a network configuration start command to the cleaning device in response to receiving a network configuration trigger command, obtaining, by the cleaning device, the second Bluetooth MAC address according to the network configuration start command, before said generating the network configuration prompt information by the base station.

3. The method according to claim 2, wherein said obtaining, by the cleaning device, the second Bluetooth MAC address according to the network configuration start command comprises:
   activating a second Bluetooth module of the cleaning device according to the network configuration start command; and
   obtaining the second Bluetooth MAC address of the second Bluetooth module of the cleaning device.

4. The method according to claim 3, wherein after said obtaining the second Bluetooth MAC address of the second Bluetooth module of the cleaning device, the method further comprises:
   detecting whether the second Bluetooth MAC address is correct; and
   sending the second Bluetooth MAC address to the base station if the second Bluetooth MAC address is correct; or sending information indicating network configuration failure to the base station through a second wireless module, and terminating a network configuration operation by the base station according to the information indicating network configuration failure, if the second Bluetooth MAC address is incorrect.

5. The method according to claim 2, wherein before said generating the network configuration prompt information by the base station, the method further comprises:
   generating, by a physical button circuit of the base station, the network configuration trigger command in response to detecting a physical button pressing operation of a user;
   detecting, by the base station, whether a first wireless module of the base station is in normal communication; and
   sending, by the base station, the network configuration start command to the cleaning device if the first wireless module of the base station is in normal communication, or terminating a network configuration operation by the base station if the first wireless module is not in normal communication.

6. A non-transitory computer readable storage medium, which stores a computer-executable instruction, that, when executed by an electronic device, causes the electronic device to perform the method for network configuration according to claim 1.

7. The method according to claim 1, wherein after said uploading, by the base station, the second Bluetooth MAC address of the cleaning device to the server through the wireless network, and before said accessing the server to obtain the second Bluetooth MAC address by the user terminal, the method further comprises: broadcasting, by the base station, information indicating that the second Bluetooth MAC address is uploaded successfully through a first Bluetooth module of the base station; and performing said accessing the server to obtain the second Bluetooth MAC address by the user terminal, when the user terminal receives the information indicating that the second Bluetooth MAC address is uploaded successfully through the first Bluetooth connection of the base station.

8. The method according to claim 1, wherein the wireless connection information comprises a wireless fidelity (Wi-Fi) account and a Wi-Fi password, said connecting to the wireless network by the base station according to the wireless connection information comprises:
by the base station, parsing the wireless fidelity (Wi-Fi) account and the Wi-Fi password from the wireless connection information and automatically connecting to the wireless network according to the Wi-Fi account and the Wi-Fi password.

9. The method according to claim 1, further comprising: receiving information indicating that a network configuration is successful from the cleaning device after said connecting the cleaning device to the wireless network by the base station according to the wireless connection information.

10. A method for network configuration, implemented by a cleaning device, comprising:
sending, by the cleaning device, a second Bluetooth MAC address of the cleaning device to a base station, and generating network configuration prompt information by the base station; wherein the network configuration prompt information is used to prompt a user terminal to establish a first Bluetooth connection with the base station, and the user terminal is configured to send wireless connection information to the base station through the first Bluetooth connection, in order that the base station accesses a wireless network according to the wireless connection information and uploads the second Bluetooth MAC address to a server through the wireless network;
establishing, by controlling the cleaning device, a second Bluetooth connection with the user terminal, and sending, by the user terminal, the wireless connection information to the cleaning device through the second Bluetooth connection; and
accessing the wireless network by the cleaning device according to the wireless connection information.

11. The method according to claim 10, wherein before said sending the second Bluetooth MAC address of the cleaning device to the base station, the method further comprises:
obtaining, by the cleaning device, a network configuration start command sent by the base station; and
obtaining, by the cleaning device, the second Bluetooth MAC address according to the network configuration start command.

12. A method for network configuration, implemented by a user terminal, comprising:
establishing, by controlling the user terminal, a first Bluetooth connection with a base station;
sending, by the user terminal, wireless connection information to the base station through the first Bluetooth connection, accessing, by the base station, a wireless network according to the wireless connection information and uploading, by the base station, a second Bluetooth MAC address of a cleaning device to a server through the wireless network; wherein the second Bluetooth MAC address is sent by the cleaning device to the base station;
accessing the server to obtain the second Bluetooth MAC address by the user terminal;
establishing, by controlling the user terminal a second Bluetooth connection with a second device according to the second Bluetooth MAC address; and
sending, by the user terminal, the wireless connection information to the cleaning device through the second Bluetooth connection, and accessing the wireless network by the cleaning device, according to the wireless connection information.

13. The method according to claim 12, wherein said accessing the server to obtain the second Bluetooth MAC address by the user terminal comprises:
accessing the server by the user terminal by polling according to a preset frequency to obtain the second Bluetooth MAC address.

* * * * *